United States Patent [19]

Negishi et al.

[11] 4,361,787
[45] Nov. 30, 1982

[54] SYSTEM FOR CONTROLLING ROTATION OF MOTOR

[75] Inventors: Kazuo Negishi; Mitsuo Fujita, both of Yokohama, Japan

[73] Assignee: Victor Company of Japan, Ltd., Yokohama, Japan

[21] Appl. No.: 205,604

[22] Filed: Nov. 10, 1980

[30] Foreign Application Priority Data

Nov. 19, 1979 [JP] Japan ............................ 54-160159[U]
Nov. 19, 1979 [JP] Japan ............................ 54-160160[U]
Nov. 20, 1979 [JP] Japan ............................ 54-160670[U]

[51] Int. Cl.³ ............................................. B65H 59/38
[52] U.S. Cl. ............................................. 318/6; 318/7; 318/53
[58] Field of Search ............... 242/75.47, 75.5, 75.51, 242/75.52; 318/3–7, 311, 388, 312, 319, 326, 396, 397, 398, 53, 59, 61, 69, 70, 72, 90, 98, 618

[56] References Cited

U.S. PATENT DOCUMENTS

| | | | |
|---|---|---|---|
| 3,458,155 | 7/1969 | Planteijdt | 318/6 |
| 3,518,516 | 6/1970 | Pawletko | 318/396 X |
| 3,582,743 | 6/1971 | Diaz et al. | 252/75.51 X |
| 4,126,817 | 11/1978 | Luzio | 318/6 X |
| 4,215,298 | 7/1980 | William et al. | 318/618 X |

Primary Examiner—Ulysses Weldon
Attorney, Agent, or Firm—Michael N. Meller; Anthony H. Handal

[57] ABSTRACT

A system for controlling the rotation of a motor comprises a detector for detecting the rotation of the motor, frequency discriminator for frequency discriminating the output of the detector, a loop filter comprising resistors and a capacitor which lowers the high-frequency components of the output signal of the frequency discriminator, a switching circuit which is connected to the output side of the loop filter, the switching circuit grounding the output side of the loop filter and discharging the capacitor of the loop filter in a state before starting of the high-speed rotation of the motor, and non-grounding the loop filter in a state in which the motor is undergoing high-speed rotation, and a motor driving circuit which drives the motor in accordance with the output signal of the loop filter through the switching circuit. The capacitor is charged up with a predetermined time constant due to the output of the frequency discriminator upon starting state of the high-speed rotation of the motor and gradually increases the output voltage of the loop filter with the predetermined time constant.

6 Claims, 5 Drawing Figures

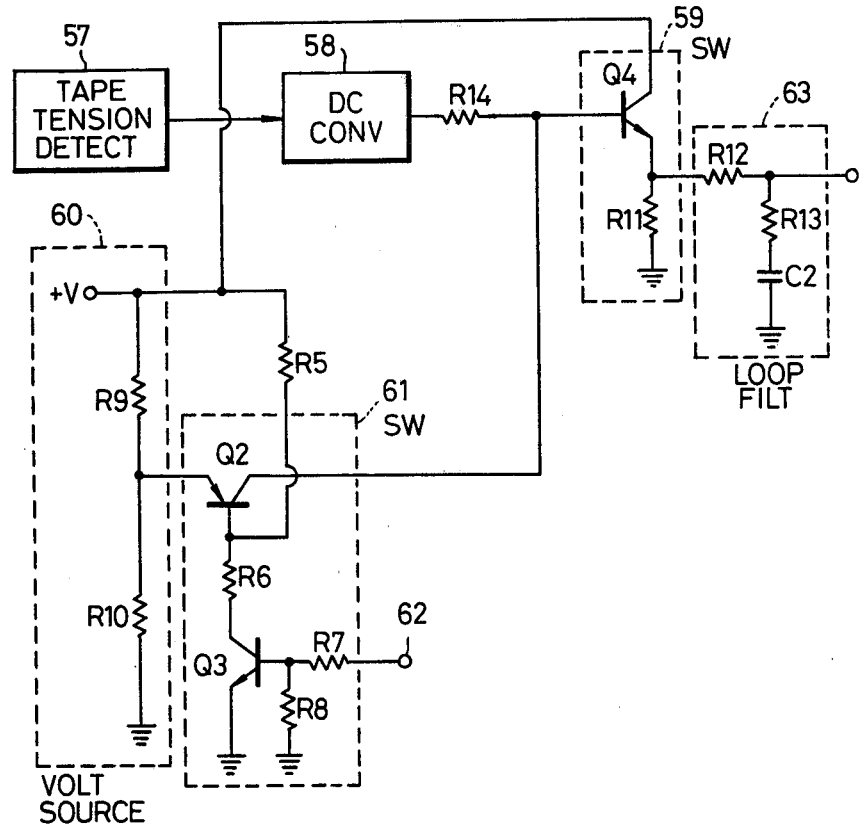
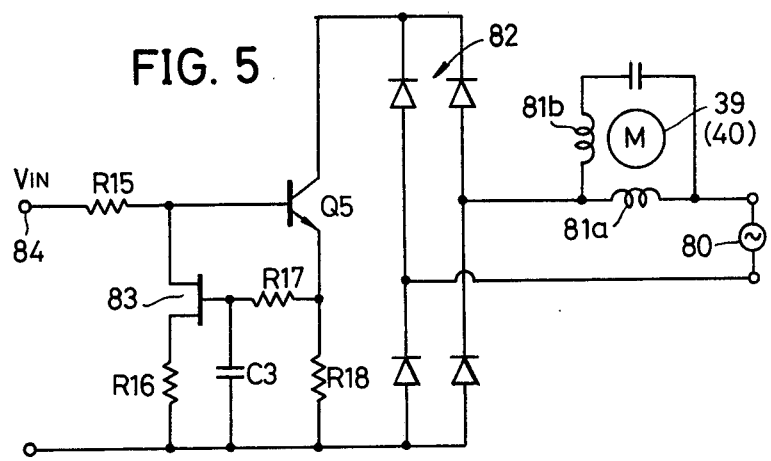

SYSTEM FOR CONTROLLING ROTATION OF MOTOR

BACKGROUND OF THE INVENTION

The present invention relates generally to motor rotation control systems, and more particularly to a system for controlling rotation of a reel driving motor in a magnetic recording and/or reproducing apparatus.

Generally, in a magnetic recording and/or reproducing apparatus, fast-forwarding or rewinding of a magnetic tape is performed by rotating the tape winding reel or the tape supplying reel at high speeds. This operation is not limited to the application in magnetic recording and/or reproducing apparatuses for audio signals, but also applicable in magnetic recording and/or reproducing apparatuses which record and/or reproduce video signals (hereinafter, referred to as video tape recorders, or simply as VTRs). In these VTRs, the fast-forwarding and rewinding operation are generally performed in a state in which the tape is not wound around the guide drum but accommodated in a tape cassette, in order to minimize the load for tape travelling. In the above magnetic recording and/or reproducing apparatuses for audio signals and VTRs, the tape travelling load is made samll upon fast-forwarding and rewinding of the tape. Accordingly, when a predetermined voltage is applied to the reel motor to rotate the reel at high speed, the motor starts to rotate rapidly. Therefore, at this moment, the tape receives a violent shock due to the sudden pulling of the tape by the reel, and in extreme cases, the tape can be damaged. Furthermore, acceleration and inertia are introduced in the reel due to the rapid start of the motor, and resulted in inconveniences such as the unstable travelling of the tape and uneven winding of the tape to the reel, due to the slack introduced in the tape.

SUMMARY OF THE INVENTION

Accordingly, a general object of the present invention is to provide a novel and useful motor rotation control system, in which the above described problems have been overcome.

Another and more specific object of the invention is to provide a motor rotation control system which uses a capacitor in a loop filter provided within a loop of the control system to gradually allow the rotation of the motor, by charging the above capacitor upon fast-speed rotation of the motor such as during the fast-forwarding and rewinding of the tape. By the system of the present invention, the motor does not start a rapid fast-speed rotation, and hence when applied as a reel motor, does not apply a sudden force on the tape or damage the tape, and moreover, the fast-forwarding of rewinding of the tape can be performed smoothly, without introducing any uneven winding of the tape.

Other objects and further features of the present invention will be apparent from the following detailed description when read in conjunction with the accompanying drawings.

BRIEF DESCRIPTION OF THE DRAWINGS

FIG. 4 is a concrete circuit diagram showing other substantial parts of the block system of FIG. 2; and FIG. 5 is a concrete circuit diagram showing a motor driving circuit in the block system of FIG. 2.

DETAILED DESCRIPTION

Figure 1:
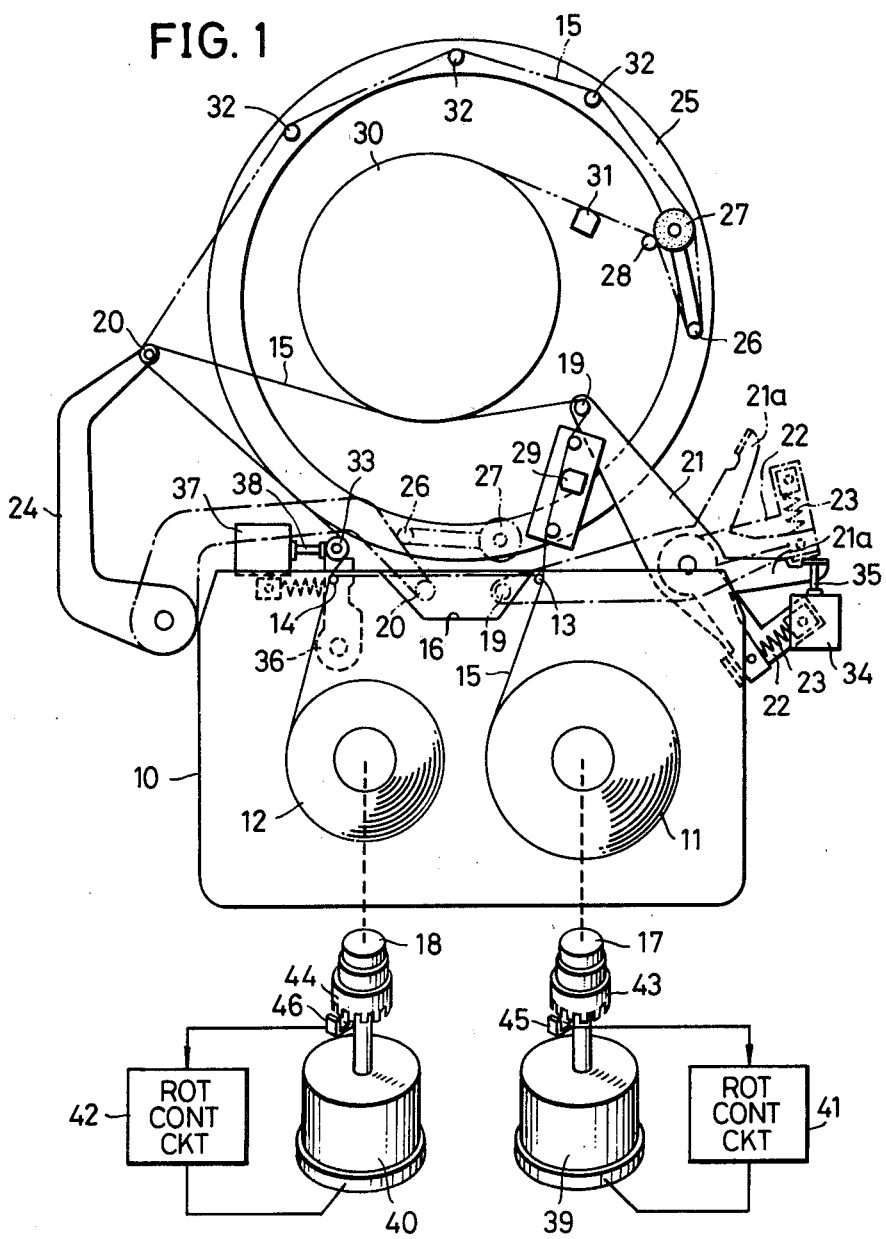
FIG. 1 is a general plan view of an example of a magnetic recording and/or reproducing apparatus for video signals applied with a motor rotation control system of the present invention.

An example of an automatic tape loading type magnetic recording and/or reproducing apparatus for video signals applied with a motor rotation control system of the present invention, will first be described in conjunction with FIG. 1.

A tape cassette 10 contains within a tape supply roll 11 and a tape take-up roll 12, and is further provided with tape guide pins 13 and 14. A magnetic tape 15 drawn out from the tape supply roll 11 is guided by the guide pin 13, and as shown by a one-dot chain line of FIG. 1, reaches the tape take-up roll 12 through the front side of the cassette, guided by the pin 14. The cassette 10 is provided with a cut-out opening 16 at its front and bottom surfaces. This opening 16 has an opening and closing cover (not shown) which opens upon insertion of the cassette 10 into the loaded position within the apparatus, and closed upon non-usage of the cassette 10 in order to protect the magnetic tape 15. When the cassette 10 is mounted on a tape supply reel disc 17 and a tape take-up reel disc 18, in a predetermined position as shown in FIG. 1, the cover of the cassette is opened and a tension pole 19 and a guide pole 20 are relatively inserted within the cassette opening 16.

The tension pole 19 is provided at the tip end of a tension lever 21, and a pushing spring 23 is provided between the tension lever 21 and a lever 22. The guide pole 20 is provided at the tip end of a rotating lever 24.

When a play operation button is pushed upon recording or reproducing mode, the levers 21 and 22 rotate in clockwise directions and the lever 24 rotates in a anti-clockwise direction from positions shown by the one-dot chain line of FIG. 1, to reach positions shown by the solid lines. By the rotations of the above levers 21 and 22, the magnetic tape 15 is engaged to and drawn out from within the cassette 10, upon projection of the poles 19 and 20 through the opening 16 of the cassette 10. Due to the above movements, the magnetic tape 15 forms a loop shown by the solid line of FIG. 1.

Next, a ring 25 rotates in a clockwise direction. In conjunction with this movement, a guide pole 26 and a pinch roller 27 provided on the ring 25 also rotate in a clockwise direction from positions shown by the one-dot chain line to positions shown by solid lines of FIG. 1. Here, the guide pole 26 engages to and draws the magnetic tape 15 around the guide drum, and load the magnetic tape 15 onto a travelling path of a loop shown by the two-dot chain line of FIG. 1 upon completion of the rotating movement by the ring 25. After the magnetic tape 15 is thus loaded, a capstan 28 and the pinch roller 27 drive to travel the magnetic tape.

The magnetic tape drawn out from the tape supply roll 11 is erased of its video information by an erasing head 29 upon recording, and makes contact with the guide drum 30 provided with rotating video heads through the tension pole 19. The video signals are recorded on and/or reproduced from the magnetic tape 15 by the rotating video heads. The audio signals are recorded and/or reproduced at an audio head 31. Accordingly, the magnetic tape is driven by the capstan 28 and the pinch roller 29, guided by the guide pole 26, a guide pole 32 and the guide pole 20, and further travels through a tension pole 33 and the pin 14, to be wound up by the take-up roll 12.

In a state where the lever 21 is in a position shown by the solid line of FIG. 1, its arm part 21a makes contact with a core 35 of a differential transformer 34. When the tension of the tape 15 guided by the tension pole 19 varies, the lever 21 undergoes a rotational displacement together with the arm part 21a, and the core 35 accordingly undergoes displacement in the differential transformer 34. Similarly, when the tension of the tape 15 guided by the tension pole 33 varies, a lever 36 undergoes rotational displacement, and a core 38 accordingly undergoes displacement in a differential transformer 37.

The reel discs 17 and 18 are respectively rotated by reel motors 39 and 40. The motors 39 and 40 are respectively controlled of their rotation by motor rotation control circuits 41 and 42. Rotating bodies 43 and 44, each provided with teeth, are respectively provided on the rotating axes of the motors 39 and 40. Rotation detectors 45 and 46 each of which comprises a photo-interrupter, are respectively provided having the teeth of the rotating bodies 43 and 44 inserted therein, so that the rotations of the rotating bodies 43 and 44 can be detected. The detected output signals of the detectors 45 and 46 can be supplied to the motor rotation control circuits 41 and 42.

The fast-forwarding and rewinding of the tape 15 are performed in a state where the tape 15 forms a loop shown by the solid line of FIG. 1. The operation upon this state will now be described in conjunction with FIGS. 2 and 3. However, since the motor rotation control circuits 41 and 42 both comprise the same circuit system shown in FIG. 2, both the motor rotation control circuits 41 and 42 will be described in conjunction with FIG. 2 in order to simply the illustration of drawing.

First, the operation upon rewinding of the tape will be described. In the motor rotation control circuit 42 during this state, when a switch 50 is closed, a low and constant voltage from a voltage source 51 is applied to the motor 40 through the switch 50, a diode D3 and a motor driving circuit 52. Hence, the motor 40 applies a back tension on the tape being rewound to the tape supply roll 11 from the tape take-up roll 12. Furthermore, no voltage is supplied to the motor driving circuit 52 through switching circuits 55 and 65.

Figures 2, 3:
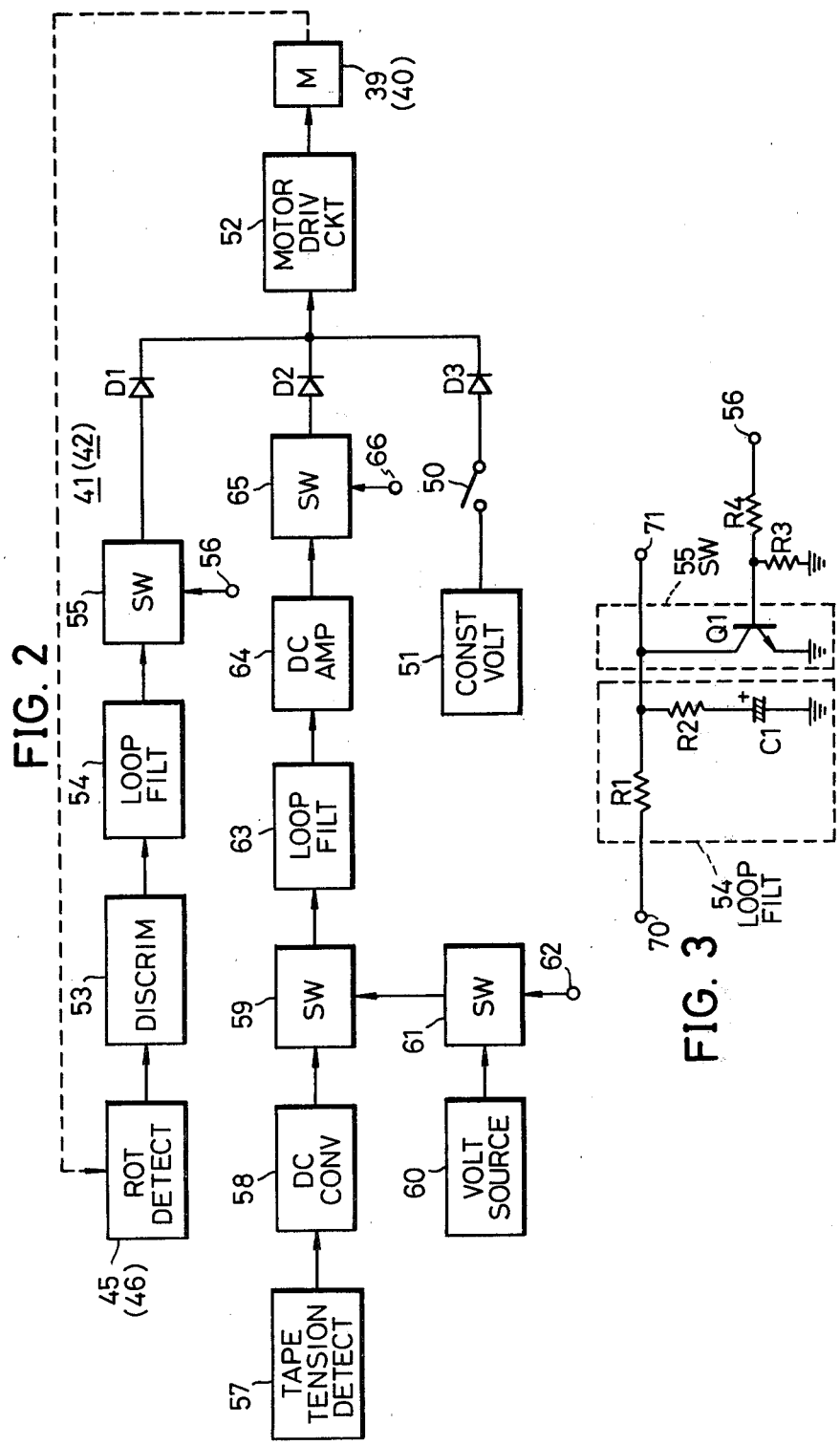
FIG. 2 is a systematic block diagram showing an embodiment of a motor rotation control system of the presnet invention.
FIG. 3 is a concrete circuit diagram showing substantial parts of the block system of FIG. 2.

On the other hand, in the motor rotation control circuit 41, the detection output signal from the rotation detector 45 is frequency-discriminated at a frequency discriminator 53, and then supplied to a loop filter 54 which lowers the gain of the high-frequency components in the loop of the loop system so that the loop system does not oscillate. The loop filter 54 comprises a lag-lead filter having resistors R1 and R2 and a capacitor C1, as shown in FIG. 3.

In a normal state before the rewinding operation, a switching signal is applied to the base of a transistor Q1 of the switching circuit 55 from a terminal 56, and the transistor Q1 is in an ON state. In this state, before the rewinding is started, no signals are obtained from the rotational detector 45 since the motor 39 is not rotating. Hence a maximum output signal is obtained from the frequency discriminator 53 and supplied to the loop filter 54 through a terminal 70. However, because the transistor Q1 is in an ON state and an output terminal 71 is therefore grounded, the output signal is not obtained from the output terminal 71. Furthermore, the capacitor C1 of the loop filter 54 discharges through the transistor Q1.

Next, when the signal supplied to the base of the transistor Q1 is interrupted responsive to a start signal just upon starting of the rewinding operation, the transistor Q1 becomes OFF. Moreover, the motor 39 starts rotating responsive to the start signal, an output signal of the frequency discriminator 53 responsive to the rotational detection output signal from the rotation detector 45 is supplied to the loop filter 54, and the capacitor C1 is charged. Accordingly, the terminal voltage of the capacitor C1 gradually rises, responsive to the time constant which is determined by the values of the resistors R1 and R2 and the capacitor C1. Therefore, a voltage which gradually rises is supplied to the motor driving circuit 52 from the loop filter 54 through the diode D1, and the motor 39 gradually starts to rotate. Hence, the motor 39 does not rapidly start a high-speed rotation, and the tape never receives any shock, and introduction of unevenness in the winding of the tape is prevented.

The level of the output signal of the frequency discriminator 53 gradually decreases after the motor 39 starts rotating, and the motor 39 is controlled of its rotational speed to be constant, after completion of the charging of the capacitor C1 and reaching of the rotational speed of the motor 39 to a predetermined rotational speed.

In order to stop the rewinding of the tape, a stop signal is applied to the terminal 56 to turn the transistor Q1 ON. The output side of the loop filter 54 is thereby grounded, and no voltage is obtained from the terminal 71, and thus the motor 39 immediately stops its rotation. Furthermore, the switch 50 is opened, and the supply of the constant voltage to the motor 40 is stopped.

In the case of fast-forwarding operation of the tape, the operations performed on the motors 39 and 40 are opposite to those of the above. That is, a low voltage for applying back tension is applied to the motor 39, and the output signal from the above loop filter 54 is applied to the motor 40. This operation is similar to that described above, and hence the description will be omitted.

Description on the tape tension control system will now be made. In accordance with the loading operation, the switching circuit 65 is opened by the supplying of an OFF-signal of the tension servo-system to a terminal 66. Furthermore, the switch 50 is closed and constant voltages are applied to the motors 39 and 40, introducing torques of predetermined values in the motors 39 and 40 so that the tape is subjected to a tension of a predetermined value.

On the other hand, when a signal is applied to a control terminal 62, an NPN transistor Q3 in a switching circuit 61 shown in FIG. 4 becomes ON, and a PNP transistor Q2 accordingly becomes ON. Hence, a DC voltage from a DC voltage source 60 is voltage-divided by resistors R9 and R10, and is applied to the base of a transistor Q4 of a switching circuit 59 through the switching circuit 61. Accordingly, the transistor Q4 becomes ON, and a capacitor C2 of a loop filter 63 is charged.

An output signal detected from a tape tension detector 57 comprising the differential transformer 34 in accordance with the tape tension, is converted to a DC signal by a DC converter 58. In the case where the impedance between the emitter and collector of a transistor Q2 shown in FIG. 4 is substantially smaller than that of a resistor R14, and the impedances of the resistors R9 and R10 are respectively substantially smaller than those of resistors R5 and R6, the voltage at the base of the transistor Q4 becomes a fixed voltage determined by the resistors R9 and R10. Here, the voltage from the voltage source 60 applied to the transistor Q4, is applied to the loop filter 63, and the output of the DC converter 58 is not applied to the loop filter 63.

When the tape is fed to a position shown by the one-dot chain line of FIG. 1 due to the rotation of the ring 25, a micro-switch (not shown) closes, and the applying of the signal to the terminal 62. Accordingly, the transistors Q3 and Q2 are turned OFF, and their impedances become high as compared to that of the resistor R14. Hence, the output from the DC converter 58 which is higher than the voltage from the voltage source 60, is applied to the transistor Q4, and charges the capacitor C2. On the other hand, a signal is applied to the terminal 66 to turn the switching circuit 65 ON, and the signal in the tension servo loop is provided to the motor driving circuit 52 through the diode D2.

Moreover, since a stable predetermined voltage which has undergone voltage-division by the resistors R9 and R10 upon loading, is applied to the capacitor C2 beforehand, the capacitor C2 is charged up to a predetermined capacity within a short period of time. The output from the DC converter 58 is applied to the motor 39 (or 40) through the switching circuit 59, loop filter 63, a DC amplifier 64, switching circuit 65, and motor driving circuit 52.

Accordingly, because the capacitor C2 is applied with a predetermined voltage beforehand, and charged, the tension servo system operates on the motor 39 (or 40) almost simultaneously as the loading is completed, and hence a predetermined tape tension can be obtained, allowing for a smooth shift from the loading mode to the play mode.

Next, an embodiment of a concrete circuit of the motor driving circuit 52, will be described in conjunction with FIG. 5.

A current from an AC power source 80 flows through windings 80a and 81b of the motor 39 (or 40), a diode bridge rectifier circuit 82, a transistor Q5, and a resistor R18. The resistor R18 for detecting the motor operating current, and a smoothing circuit comprising a resistor R17 and a capacitor C3, are connected in parallel between the emitter of the transistor Q5 and the ground. The connection point between the resistor R17 and capacitor C3 is connected to the gate of a field-effect-transistor (FET) 83. The drain of the FET 83 is connected to the base of the transistor Q5 as well as to the resistor R15, and its source is connected to a current limiting resistor R16.

When the rotating speed of the motor 39 (or 40) is held constant by controlling the conducting state of the transistor Q5 by use of a control signal from a terminal 84, the voltage between the terminals of the resistor R18 is smoothed by the resistor R17 and capacitor C3, and conducts (operates) the FET 83 according to the magnitude of this voltage. A voltage corresponding to the voltage between the terminals of the resistor R18 is fed back to the base of the transistor Q5.

In this case, when a voltage $V_{IN}$ of the control signal from a terminal 84 is relatively high, the voltage between the terminals of the resistor R18 becomes high, and hence the gate voltage of the FET 83 accordingly becomes high, putting the FET 83 into a fully conducting state. Hereupon, a voltage equal to R16/(R15+R16). $V_{IN}$ is applied to the base of the transistor Q5. If the impedance of the circuit connected to the collector of the transistor Q5 is designated by Z, the gain of the circuit is $(Z/R18) \times [R16/(R15+R16)]$. On the other hand, when the voltage $V_{IN}$ is relatively low, the voltage between the terminals of the resistor R18 becomes low, and thus the gate voltage of the FET 83 accordingly becomes low, putting the FET 83 into a nonconducting state. Here, the voltage $V_{IN}$ is applied to the base of the transistor Q5, and the gain of the circuit is then Z/R18.

Accordingly, sufficient varying range of the circuit gain can be obtained, namely, in a range varying from $(Z/R18) \times [R16/(R15+R16)]$ to $Z/R18$.

Furthermore, when the series impedance of the FET 83 and the resistor R16 is designated by X, the gain on the input side is X/R15, and the gain as a whole becomes $(Z/R18) \times (X/R15)$.

On the other hand, because the emitter voltage of the transistor Q5 is detected by the resistor R18 and fedback to its base, when the control voltage $V_{IN}$ is constant, the base voltage of the transistor Q5 can be held constant, for example, even when there are fluctuations in the output of the AC power source of unevenness in the temperature characteristic of the transistor Q5, and controllable in a stable manner.

Further, this invention is not limited to these embodiments but various variations and modifications may be made without departing from the scope of the invention.

What is claimed is:

1. A control system for controlling the rotation of a motor comprising:
   (a) detection means for detecting the rotation of said motor, said detection means having an output signal;
   (b) frequency discrimination means for frequency-discriminating the output signal of said detection means;
   (c) a loop filter for lowering high-frequency components of the output signal of said frequency discrimination means, said loop filter having an input side and an output side, said loop filter comprising:
      (i) a resistor;
      (ii) means for coupling one terminal of said resistor to the input side of said loop filter; and
      (iii) capacitor coupled between the other terminal of said resistor and a reference potential;
   (d) a switching circuit connected to the output side of said loop filter, said switching circuit shorting the output side of said loop filter and discharging said capacitor of said loop filter in a state before starting of the high-speed rotation of said motor, and opening the shorting in a state where said motor is undergoing high-speed rotation; and
   (e) a motor driving circuit for driving said motor in accordance with the output signal of said loop filter through said switching circuit, said capacitor being charged with a predetermined time constant due to the output of said frequency discrimination means upon starting of the high-speed rotation of said motor and gradually increasing the output voltage of said loop filter with said predetermined time constant.

2. A control system as claimed in claim 1 which is applied to an apparatus for recording and/or reproducing signals on a magnetic tape, in which said motor of said system is a motor for driving and rotating a reel which is wound around thereon with said magnetic tape, and said switching circuit opens the shorting of the output side of said loop filter upon fast-forwarding or rewinding mode operation of said magnetic tape.

3. A control system as claimed in claim 1 in which said switching circuit comprises a transistor connected between the output side of said loop filter and the reference potential, said transistor being turned ON upon starting of the high-speed rotation of said motor and supplied with a signal at its base which turns said transistor OFF upon the state where said motor is undergoing high-speed rotation.

4. A control system as claimed in claim 1 which is applied to a magnetic recording and/or reproducing apparatus, comprising:
(a) loading means for loading a magnetic tape to a predetermined tape travelling path by drawing out said magnetic tape from within a cassette accommodating magnetic tape winding rolls therein, in which said motor of said system is a motor for driving and rotating a reel which is wound around thereon with said magnetic tape;
(b) tension detection means for detecting the tension on said magnetic tape and producing an output signal in response thereto;
(c) a second loop filter for lowering the high-frequency components of the output signal of said tension detections means, said second loop filter supplying its output to said motor driving circuit; and
(d) means for supplying a predetermined DC voltage to said second loop filter until the completion of the loading operation by said loading means and supplying the output signal of said tension detection means to said second loop filter after completion of said loading operation.

5. A control system as claimed in claim 1 in which said motor is an AC motor, and said motor driving circuit comprises:
(a) a power source for supplying an AC current to the coils of said motor;
(b) a rectifying circuit which rectifies the current from said power source;
(c) a transistor supplied with the current which is rectified by said rectifying circuit at its collector and supplied with the output signal of said loop filter at its base;
(d) a current detecting resistor connected between the emitter of said transistor and said reference potential;
(e) a smoothing circuit having a second resistor and a capacitor, said smoothing circuit being connected in parallel with said current detecting resistor;
(f) a field-effect-transistor having connected its drain and gate respectively to the base of said transistor and said smoothing circuit;
(g) a third resistor connected between the drain of said field-effect-transistor and an input terminal for the output signal of said loop filter; and
(h) a fourth resistor connected between the source of said field-effect transistor and said reference potential.

6. A control system as claimed in claim 1 wherein said capacitor is coupled to said other terminal of said resistor by a coupling resistor placed in series with said capacitor.

* * * * *